United States Patent
Tsuruoka

(10) Patent No.: US 9,354,375 B2
(45) Date of Patent: May 31, 2016

(54) GRID POLARIZING ELEMENT AND APPARATUS FOR EMITTING POLARIZED UV LIGHT

(71) Applicant: USHIO DENKI KABUSHIKI KAISHA, Tokyo (JP)

(72) Inventor: Kazuyuki Tsuruoka, Yokohama (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/578,876

(22) Filed: Dec. 22, 2014

(65) Prior Publication Data
US 2015/0185386 A1    Jul. 2, 2015

(30) Foreign Application Priority Data
Dec. 26, 2013    (JP) ................................. 2013-269614

(51) Int. Cl.
G02B 5/30    (2006.01)

(52) U.S. Cl.
CPC ............ G02B 5/3058 (2013.01); G02B 5/3075 (2013.01)

(58) Field of Classification Search
CPC ............................ G02B 5/3058; G02B 5/3075
USPC ........................................ 359/485.05, 487.03
See application file for complete search history.

(56) References Cited

U.S. PATENT DOCUMENTS

| | | | |
|---|---|---|---|
| 5,091,244 A | 2/1992 | Biornard | |
| 5,407,733 A | 4/1995 | Bjornard et al. | |
| 7,570,424 B2 | 8/2009 | Perkins et al. | |
| 7,630,133 B2 | 12/2009 | Perkins | |
| 7,800,823 B2 | 9/2010 | Perkins | |
| 7,813,039 B2 | 10/2010 | Perkins et al. | |
| 7,961,393 B2 | 6/2011 | Perkins et al. | |
| 8,027,087 B2 | 9/2011 | Perkins et al. | |
| 2008/0278811 A1* | 11/2008 | Perkins ................ | G02B 5/3058 359/485.05 |
| 2008/0303987 A1* | 12/2008 | Kumai ................ | G02B 5/3058 349/96 |
| 2010/0127238 A1* | 5/2010 | Kim ...................... | H01L 33/387 257/13 |

(Continued)

FOREIGN PATENT DOCUMENTS

| JP | H06-510382 A | 11/1994 |
|---|---|---|
| JP | 2010-169667 A | 8/2010 |

(Continued)

OTHER PUBLICATIONS

An Office Action; "Decision of Refusal," issued by the Japanese Patent Office on Dec. 22, 2015, which corresponds to Japanese Patent Application No. 2013-269614 and is related to U.S. Appl. No. 14/578,876; with English language translation.

Primary Examiner — Frank Font
(74) Attorney, Agent, or Firm — Studebaker & Brackett PC

(57) ABSTRACT

A non-reflection type grid polarizing element can stably provide a desired polarizing effect even when the grid polarizing element is used under conditions such as in an oxidizing environment (e.g., when the polarizing element is used to polarize the ultraviolet light). The grid polarizing element is easy to fabricate. The grid polarizing element selectively transmits particular polarized light among incident light through the polarizing element to polarize the incident light. The grid polarizing element includes a transparent substrate and a grid disposed on the transparent substrate. The grid has a plurality of linear portions arranged like a stripe. Each of the linear portions has a dominant layer made from titanium nitride or titanium oxynitride. The linear portions contain no simple metal layers.

20 Claims, 9 Drawing Sheets

(56) References Cited

U.S. PATENT DOCUMENTS

| | | |
|---|---|---|
| 2010/0328769 A1 | 12/2010 | Perkins |
| 2011/0080640 A1* | 4/2011 | Kaida .................. G02B 5/3058 359/485.05 |
| 2012/0008205 A1 | 1/2012 | Perkins et al. |
| 2013/0120672 A1* | 5/2013 | Kumai .................. G02F 1/1335 349/5 |

FOREIGN PATENT DOCUMENTS

| | | |
|---|---|---|
| JP | 5184624 B2 | 4/2013 |
| JP | 5224252 B2 | 7/2013 |
| JP | 5277455 B2 | 8/2013 |
| WO | 2013/095062 A1 | 6/2013 |

* cited by examiner

GRID POLARIZING ELEMENT AND APPARATUS FOR EMITTING POLARIZED UV LIGHT

FIELD OF THE INVENTION

The present invention relates to a grid polarizing element. The grid polarizing element is one type of a polarizer.

DESCRIPTION OF THE RELATED ART

Polarizing elements (polarizers) designed to obtain polarized light (ray, beam) are known in the form of variety products such as customer goods (e.g., polarized sunglasses) and optical elements (e.g., polarizing filters and polarizing films). Such polarizing elements are also often used in various types of display devices such as liquid crystal display devices. In general, the polarizing elements can be categorized into a plurality of groups depending upon a method of extracting polarized light. One of the groups is a wire grid polarizer.

The wire grid polarizer includes a transparent substrate and a fine stripe-shaped grid disposed on the transparent substrate. The grid is made from a metal (conductive material). The grid has a number of linear portions spaced from each other. The wire grid polarizer can function as a polarizing element because the gap (pitch) between each two adjacent linear portions is equal to or smaller than the wavelength of light to be polarized. The wire grid polarizer is equivalent to a flat metal for that polarized light, among the linearly polarized light, which has an electric field component in a longitudinal direction (length direction) of the grid. Thus, the wire grid polarizer reflects such polarized light. On the other hand, the wire grid polarizer is equivalent to the only transparent substrate for that polarized light, among the linearly polarized light, which has the electric field component in a direction perpendicular to the longitudinal direction (length direction) of the grid. Thus, the wire grid polarizer allows such polarized light to pass (transmit) through the transparent substrate and become the outgoing light (emitted light). Thus, the linear polarized light is only emitted from the wire grid polarizer in the direction perpendicular to the longitudinal direction of the grid. If a posture or orientation of the wire grid polarizer is appropriately controlled such that the longitudinal direction of the grid is directed to a desired direction, then it is possible to obtain the polarized light that has an axis of polarized light (direction of the electric field component) directed to a desired direction.

In the following description, the linearly polarized light that has an electric field component in the longitudinal direction of the grid is referred to as an "s polarized light" and the linearly polarized light that has an electric field component in a direction perpendicular to the longitudinal direction of the grid is referred to as "p polarized light" for the sake of description. Generally, a wave that has an electric field perpendicular to an incident plane (plane perpendicular to a reflecting plane, and including incident light and reflected light) is referred to as "s wave," and a wave that has an electric field in parallel to the incident plane is referred to as "p wave." In this specification, the longitudinal direction of the grid is assumed to be parallel to the incident plane (plane of incidence), and the "s polarized light" and the "p polarized light" are defined as described above.

Fundamental indices used to indicate the capabilities and properties (characteristics) of such polarizer include an extinction ratio ER and a transmittance (light permeability) TR. The extinction ratio ER is a ratio of an intensity (Ip) of the p polarized light of the polarized light, which transmits the polarizer, to an intensity (Is) of the s polarized light of the polarized light (ER=Ip/Is). The transmittance TR is a ratio of an energy of the outgoing p polarized light to a total energy of the incident s polarized light and p polarized light (TR=Ip/(Is+Ip)). The extinction ratio ER of an ideal polarizer is infinite, and the transmittance TR of the ideal polarizer is 0.5 (50%).

LISTING OF REFERENCES

Patent Literatures

PATENT LITERATURE 1: Japanese Patent No. 5184624
PATENT LITERATURE 2: Japanese Patent No. 5224252
PATENT LITERATURE 3: Japanese Patent No. 5277455

SUMMARY OF THE INVENTION

The wire grid polarizing element uses a metal for the grid material, as its name "wire" suggests. As mentioned above, the wire grid polarizing element is designed to cause the grid to selectively reflect the s wave in order to obtain the polarizing effect. The inventor's study and research revealed that the wire grid polarizing element inevitably suffers from the deterioration of the metal.

The wire grid polarizing element is fabricated by forming a metal film on a transparent substrate, and applying a photolithography process to create a minute (fine) grid structure. In the fabrication process, a certain type of heating is often carried out, and this heating may thermally oxidize the surface of the metal. For example, aluminum is often used as the material of the grid, and the polarizing element that has the aluminum grid is quickly oxidized as the polarizing element is subjected to the air at a high temperature. As a result, an alumina layer is formed on the surface of the grid.

As described above, the wire grid polarizing element is designed such that the gap (spacing) between each two adjacent linear portions of the grid has an optimal value in consideration of the wavelength of the light to be polarized. The design parameters naturally include physical properties of the grid material (particularly, optical constants) as the important parameters. The optical constants include n and k of the complex index of refraction. When the grid is made from aluminum, and the oxidized layer is afterward formed on the surface of the grid, then the optical constants change from those optical constants which are decided at the time of the designing. As a result, the polarizing element may not be able to provide a desired polarizing effect. The grid may be made from other metals such as copper, but the same thing may occur. If gold is used as the grid material, gold is not be oxidized, but the microprocessing is difficult to perform on gold and the cost increases.

The deterioration of the grid is caused by not only the factors during the fabrication but also by the factors during use (i.e., environment of use). For example, if the polarizing element is used in an environment of easy-to-be-oxidized such as environment of high temperature and high humidity, the grid is easily deteriorated. Another cause for deteriorating the grid while the polarizing element is used is the light to be polarized. If the light to be polarized is ultraviolet light, it can deteriorate the grid.

It is well known that when the polarizing element (or grid thereof) is irradiated with the ultraviolet light, active oxygen species (e.g., atomic oxygen) are produced. The active oxygen species have a strong oxidizing effect. In particular, ozone or the active oxygen species produced by the ultraviolet light having a wavelength equal to or less than 300 nm has a strong oxidizing effect, and can quickly oxidize aluminum and a similar metal. A photo process such as photo-alignment (photo-orientation) may need to irradiate an object with the polarized light at a high illuminance (illumination intensity) in order to increase the productivity. In this case, the metal is heated by the radiation of the high illuminance light, and may thermally be oxidized.

When the grid is made from aluminum, a thin film that will be used as the grid is usually prepared by sputtering, and an aluminum target is used in the sputtering process. Then, the grid having a stripe shape is obtained by etching. The sputtering process may be a DC (direct current) sputtering or a RF (radio frequency) sputtering. In the sputtering process, an applied electric power (specific power, power density) at the surface of the target to be sputtered is approximately 1 to 10 $W/cm^2$, the atmosphere pressure is approximately 0.01 to 0.1 Pa, the flow rate of the sputtering gas (argon gas) is approximately 10 to 50 SCCM (standard cubic centimeter per minute), and a substrate temperature is approximately 20 to 100 degrees C. The aluminum film is prepared in this manner, and is irradiated with the ultraviolet light at the wavelength equal to or less than 380 nm. Then, the oxidization of aluminum is observed, and the reflectance (reflectivity) drops.

The problem of the metal oxidization by the light irradiation is serious because the metal oxidization influences the polarizing mechanism of the conventional wire grid polarizing element. As described above, the wire grid of the wire grid polarizing element selectively reflects the s wave to provide the polarizing effect. The metal such as aluminum or copper tends to absorb more ultraviolet light upon oxidization of the metal. This results in the drop of the reflectance. Thus, when the wire grid polarizing element that has the grid made from such metal is used for the ultraviolet light, the grid is oxidized in a short time and the ultraviolet light absorption increases. Then, the polarizing element cannot provide a desired (expected) polarizing effect (i.e., extinction ratio and light permeability). It should also be noted that a certain type of metal has, even in its initial condition, a high absorption capability to the ultraviolet light. Such type of metal cannot be used for the ultraviolet light (for the polarizing element to polarize the ultraviolet light). The above-described facts were revealed by the study and research carried out by the inventor.

Conventional wire grid polarizing elements are disclosed in, for example, Patent Literatures 1 to 3 (Japanese Patent No. 5184624, Japanese Patent No. 5224252, and Japanese Patent No. 5277455). In these conventional wire grid polarizing elements, an element 26 (i.e., wire grid) that is a main layer for providing the polarizing effect is made from aluminum, silver, gold or copper (see Japanese Patent No. 5184624, paragraph 0019, for example). The polarization of the ultraviolet light is also mentioned (see Japanese Patent No. 5184624, paragraph 0015). In reality, however, the grid is oxidized upon irradiation of the ultraviolet light and the ultraviolet light reflectance drops, or the grid absorbs a large(r) amount of ultraviolet light from the beginning (from the initial condition of the grid) and reflects a less amount of ultraviolet light. Therefore, although Patent Literatures 1 to 3 (Japanese Patent No. 5184624, Japanese Patent No. 5224252, and Japanese Patent No. 5277455) mention the polarization of the ultraviolet light, the polarizing elements disclosed in these documents cannot function as the reflection type polarizing elements practically, or can hardly provide a sufficient polarizing effect.

The inventor developed a polarizing element that is fundamentally (essentially) different from the reflection type conventional wire grid polarizing element, based on a completely different technical concept. Specifically, the inventor developed a non-reflection type (i.e., absorption type) polarizing element. The polarizing element of the present invention is not directed to a reflection type polarizing element. Because the main part of the polarizing element of the present invention which provides the polarizing effect is not made from a simple metal, the polarizing element of the present invention is referred to as "grid polarizing element" in the following description. The term "simple metal" means a metal that is not bonded to atoms of other metal (i.e., non-mixture metal).

The absorption type grid polarizing element takes advantage of the light absorption caused by the metallic compound or a dielectric. The absorption type grid polarizing element utilizes the light absorption as a main tool for providing the polarizing effect. As will be described later, the material that absorbs the light is selected as the grid material, and the grid height is increased to have an increased aspect ratio. Then, it is possible to selectively absorb and attenuate the s wave and to allow the p wave to pass through. As a result, a sufficient polarizing effect is obtained.

In Patent Literatures 1 to 3 (Japanese Patent No. 5184624, Japanese Patent No. 5224252, and Japanese Patent No. 5277455), absorbing layers 34a and 34b are provided on the element 26 made from a simple metal such as aluminum. According to the disclosure of Japanese Patent No. 5184624, Japanese Patent No. 5224252, and Japanese Patent No. 5277455, the absorbing layers 34a and 34b are provided for absorbing the s wave that is selectively reflected by the element 26 (wire grid) (see, for example, Japanese Patent No. 5184624, paragraph 0021). It is assumed that the s wave reflected by the element 26 should be absorbed in order to prevent the s wave reflected by the element 26 from exerting adverse influences on other elements.

The present invention is developed in view of the above-described problems and considerations, and an object of the present invention is to provide a non-reflection type (or absorption type) grid polarizing element that is easy to fabricate and can stably or consistently provide a desired polarizing effect even when the grid polarizing element is used under conditions such as in an oxidizing environment (e.g., when the polarizing element is used for the ultraviolet light or the light having a wavelength in the UV region).

According to one aspect of the present invention, there is provided a grid polarizing element that includes a transparent substrate, and a grid having a stripe shape and disposed on the transparent substrate. The grid polarizing element is configured to selectively cause particular polarized light, among incident light, to pass through the polarizing element, thereby polarizing the incident light. The grid has a plurality of linear portions arranged like a stripe. Each of the linear portions has a dominant layer (main layer) made from titanium nitride or titanium oxynitride. The linear portions do not contain simple metal layers. The grid polarizing element is a non-reflection type grid polarizing element.

In the grid polarizing element of the first aspect of the present invention, the dominant layer of each linear portion is made from titanium nitride or titanium oxynitride, and does not have a simple metal layer. Thus, the grid polarizing element can function as the absorption type grid polarizing element, and does not suffer from the deterioration of the polarizing property even when the polarizing element is used in an environment in which the oxidization easily takes place. Accordingly, the grid polarizing element is particularly preferable when the light to be polarized has a ultraviolet light wavelength.

A ratio of h/w may be equal to or greater than three where h represents a height of each linear portion of the grid and w represents a width of each linear portion of the grid. Because the aspect ratio of each linear portion is equal to or greater than three, the absorption type polarizing element has a high extinction ratio, and can provide the high quality polarized light.

The linear portions may be configured to polarize the light by absorbing the polarized light that has a polarization axis in a longitudinal direction of the linear portions in a larger amount than the polarized light that has a polarization axis in a direction perpendicular to the longitudinal direction of the linear portions while the light is propagating in a thickness direction of the linear portions. Because the grid polarizing element can function as the absorption type polarizing element, the grid polarizing element is a preferred polarizing element to polarize ultraviolet light (light having a UV wavelength).

Spacing between each two adjacent linear portions of the grid may be able to polarize ultraviolet light. The spacing between each two adjacent linear portions of the grid may be between 100 nm and 200 nm. This polarizing element can polarize ultraviolet light.

According to another aspect of the present invention, there is provided a method of irradiating an object with the polarized ultraviolet light. The method includes arranging a non-reflection type grid polarizing element at a position where light emitted from a mercury lamp reaches. The light emitted from the mercury lamp includes a bright line spectrum at a wavelength equal to or less than 260 nm. The method also includes irradiating the object with the polarized light that has passed the non-reflection type grid polarizing element. The grid polarizing element includes a transparent substrate, and a grid having a stripe shape and disposed on the transparent substrate. The grid polarizing element is configured to selectively cause particular polarized light, among incident light, to pass through the polarizing element, thereby polarizing the incident light. The grid has a plurality of linear portions arranged like a stripe. Each of the linear portions has a dominant layer made from titanium nitride or titanium oxynitride. The linear portions do not contain simple metal layers. The grid polarizing element is a non-reflection type grid polarizing element. A ratio of h/w may be equal to or greater than three where h represents a height of each linear portion of the grid and w represents a width of each linear portion of the grid. The linear portions may be configured to polarize the light by absorbing the polarized light that has a polarization axis in a longitudinal direction of the linear portions in a larger amount than the polarized light that has a polarization axis in a direction perpendicular to the longitudinal direction of the linear portions while the light is propagating in a thickness direction of the linear portions. Spacing between each two adjacent linear portions of the grid may be able to polarize ultraviolet light. The spacing between each two adjacent linear portions of the grid may be between 100 nm and 200 nm. Because the resulting polarizing effect entails a high extinction ratio in a UV region with a wavelength equal to or shorter than 260 nm, it is possible to emit the high quality polarized light having a strong bright line spectrum.

According to still another aspect of the present invention, there is provided an apparatus for irradiating an object with polarized ultraviolet light. The apparatus includes a mercury lamp configured to emit light including a bright line spectrum at a wavelength equal to or less than 260 nm. The apparatus also includes a non-reflection type grid polarizing element disposed at a position where the light emitted from the mercury lamp reaches. The grid polarizing element is configured to irradiate the object with the polarized light that has passed the non-reflection type grid polarizing element. The grid polarizing element includes a transparent substrate, and a grid having a stripe shape and disposed on the transparent substrate. The grid polarizing element is configured to selectively cause particular polarized light, among incident light, to pass through the polarizing element, thereby polarizing the incident light. The grid has a plurality of linear portions arranged like a stripe. Each of the linear portions has a dominant layer made from a titanium nitride or titanium oxynitride. The linear portions do not contain simple metal layers. The grid polarizing element is a non-reflection type grid polarizing element. A ratio of h/w may be equal to or greater than three where h represents a height of each linear portion of the grid and w represents a width of each linear portion of the grid. The linear portions may be configured to polarize the light by absorbing the polarized light that has a polarization axis in a longitudinal direction of the linear portions in a larger amount than the polarized light that has a polarization axis in a direction perpendicular to the longitudinal direction of the linear portions while the light is propagating in a thickness direction of the linear portions. Spacing between each two adjacent linear portions of the grid may be able to polarize ultraviolet light. The spacing between each two adjacent linear portions of the grid may be between 100 nm and 200 nm. Because the resulting polarizing effect entails a high extinction ratio in a UV region with a wavelength equal to or shorter than 260 nm, it is possible to emit the high quality polarized light having a strong bright line spectrum.

According to yet another aspect of the present invention, there is provided a method of fabricating a substrate that has a photo-alignment (photo-aligned) layer. The method includes arranging a non-reflection type grid polarizing element at a position where light emitted from a ultraviolet light source reaches. The method also includes irradiating a film, which becomes the photo-alignment layer, with the polarized ultraviolet light that has passed the non-reflection type grid polarizing element. The grid polarizing element is configured to irradiate the object with the polarized light that has passed the non-reflection type grid polarizing element. The grid polarizing element includes a transparent substrate, and a grid having a stripe shape and disposed on the transparent substrate. The grid polarizing element is configured to selectively cause particular polarized light, among incident light, to pass through the polarizing element, thereby polarizing the incident light. The grid has a plurality of linear portions arranged like a stripe. Each of the linear portions has a dominant layer made from titanium nitride or titanium oxynitride. The linear portions do not contain simple metal layers. The grid polarizing element is a non-reflection type grid polarizing element. A ratio of h/w may be equal to or greater than three where h represents a height of each linear portion of the grid and w represents a width of each linear portion of the grid. The linear portions may be configured to polarize the light by absorbing the polarized light that has a polarization axis in a longitudinal direction of the linear portions in a larger amount than the polarized light that has a polarization axis in a direction perpendicular to the longitudinal direction of the linear portions while the light is propagating in a thickness direction of the linear portions. Spacing between each two adjacent linear portions of the grid may be able to polarize ultraviolet light. The spacing between each two adjacent linear portions of the grid may be between 100 nm and 200 nm. The polarizing property of the grid polarizing element does not change because the deterioration of the polarizing element does not occur. Thus, the polarizing property of the grid polarizing element does not change even if the polarized ultraviolet light having a high illuminance is emitted while the photo-alignment is being performed. Accordingly, it is possible to obtain a desired effect of the photo-alignment stably and at a high productivity.

According to another aspect of the present invention, there is provided a photo-alignment apparatus that includes a ultraviolet light source to emit light. The apparatus also includes a non-reflection type grid polarizing element disposed at a first position where the light emitted from the ultraviolet light source reaches. The apparatus also includes a unit or mechanism configured to transport or place a film, which becomes a photo-alignment layer, at a second position irradiated with the polarized ultraviolet light that has passed the no reflection type grid polarizing element. The grid polarizing element includes a transparent substrate, and a grid having a stripe shape and disposed on the transparent substrate. The grid polarizing element is configured to selectively cause particular polarized light, among incident light, to pass through the polarizing element, thereby polarizing the incident light. The grid has a plurality of linear portions arranged like a stripe. Each of the linear portions has a dominant layer made from titanium nitride or titanium oxynitride. The linear portions do not contain simple metal layers. The grid polarizing element is a non-reflection type grid polarizing element. A ratio of h/w may be equal to or greater than three where h represents a height of each linear portion of the grid and w represents a width of each linear portion of the grid. The linear portions may be configured to polarize the light by absorbing the polarized light that has a polarization axis in a longitudinal direction of the linear portions in a larger amount than the polarized light that has a polarization axis in a direction perpendicular to the longitudinal direction of the linear portions while the light is propagating in a thickness direction of the linear portions. Spacing between each two adjacent linear portions of the grid may be able to polarize ultraviolet light. The spacing between each two adjacent linear portions of the grid may be between 100 nm and 200 nm. The polarizing property of the grid polarizing element does not change because the deterioration of the polarizing element does not occur. Thus, the polarizing property of the grid polarizing element does not change even if the polarized ultraviolet light having a high illuminance is emitted while the photo-alignment is being performed. Accordingly, it is possible to obtain a desired effect of the photo-alignment stably and at a high productivity.

These and other objects, aspects and advantages of the present invention will become apparent to those skilled in the art from the following detailed description when read and understood in conjunction with the appended claims and drawings.

DETAILED DESCRIPTION OF THE INVENTION

Embodiments of the present invention will now be described with reference to the accompanying drawings.

First Embodiment

Figure 1:
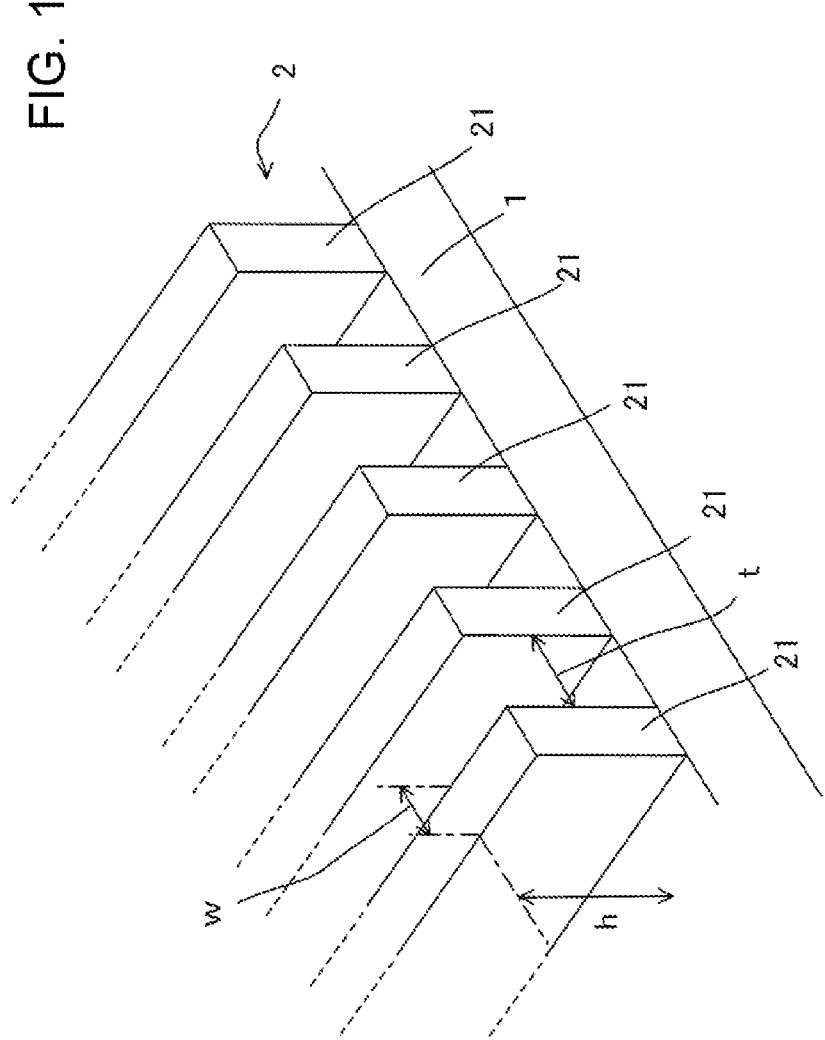
FIG. 1 is a general perspective view of a grid polarizing element according to a first embodiment of the present invention.

Firstly, a grid polarizing element according to a first embodiment of the present invention will be described. FIG. 1 is a schematic perspective view showing the grid polarizing element according to the first embodiment of the present invention. The grid polarizing element shown in FIG. 1 includes a transparent substrate 1 and a grid 2 disposed on the transparent substrate 1.

The transparent substrate 1 is "transparent" because the substrate 1 has sufficient permeability to a target wavelength (wavelength of light to be polarized by the polarizing element). This embodiment assumes that the wavelength of the light to be polarized is the ultraviolet wavelength (light to be polarized is ultraviolet light). Thus, the material of the transparent substrate 1 is a quartz (silica) glass (e.g., synthetic quarts).

As illustrated in FIG. 1, the grid 2 has a plurality of linear portions 21 that extend in parallel to each other. Thus, the grid 2 has a stripe shape, which can define lines and spaces. Each of the linear portions 21 of the grid 2 is linear when viewed from the top. Each linear portion 21 has a height h, as shown in FIG. 1. Each linear portion 21 has a width w. Each two adjacent linear portions 21 are spaced from each other by a gap t. The grid 2 has a three-dimensional structure defined by the linear portions 21 and the gaps t between the linear portions 21 to provide the polarizing effect.

In this embodiment, the material of the linear portions 21 of the grid 2 is titanium nitride. Titanium nitride is selected as the material of the linear portions 21 because the polarizing element is configured as an absorption type grid polarizing element, and a desired polarizing effect is stably obtained regardless of use (operating) conditions.

The inventor's research revealed that the material of the linear portions 21 needed to have a suitable coefficient of extinction (imaginary part of a complex index of refraction) k to configure the absorption type grid polarizing element. The coefficient of extinction k of titanium nitride is approximately 0.8 to 1.6 in, for example, a UV region with the wavelength of about 200-380 nm. Thus, titanium nitride is a preferred material for the absorption type grid 2.

It is well known that titanium nitride is a chemically stable material, and difficult to deteriorate even if titanium nitride is placed in an active atmosphere. In particular, the inventor noted that the optical property that would affect the polarizing effect (polarizing capability) changed little even if the linear portions made from titanium nitride are subjected to an oxidizing chemical species such as ozone or active oxygen species and part of the linear portions is oxidized.

The polarizing capability of the grid polarizing element is decided by the dimensions (size and shape) of the grid, and the optical characteristics of the linear portions of the grid (particularly the optical constant, i.e., complex index of refraction: n and k). For the absorption type polarizing element, the imaginary part (coefficient of extinction k) of the complex index of refraction is particularly important (will be described later). The polarizing element has to have a suitable coefficient of extinction k in a wavelength region of the light to be polarized.

The inventor's research revealed that the difference between the values n and k of titanium nitride and the values n and k of titanium oxynitride was small. In particular, the difference between the values n and k of titanium nitride and the values n and k of titanium oxynitride is small in a UV region with a wavelength equal to or less than 380 nm. In addition, the difference between the values n and k of titanium nitride and the values n and k of titanium oxide is small. The term "small" means that the difference is smaller than the optical constant difference between a simple metal (e.g., aluminum) and an oxide of that metal (e.g., alumina) when aluminum is oxidized to alumina.

When titanium nitride is subjected (exposed) to the oxidizing chemical species such as ozone or active oxygen species, it is assumed that part of titanium nitride may be oxidized to titanium oxynitride. Even if it occurs, the optical constant of titanium oxynitride is not different very much from the optical constant of titanium nitride, and therefore the polarizing capability is not impaired very much. In other words, it is possible to stably obtain a good polarizing effect from the polarizing element if the grid of the polarizing element has appropriate dimensions (t, w and h shown in FIG. 1) as the titanium nitride-made grid. Even if titanium nitride changes to titanium oxide, the optical constant does not change very much. It should be noted that it is unlikely that titanium nitride changes to titanium oxide in a usual circumstance. In conclusion, good polarizing effect is stably provided by the polarizing element if the grid of the polarizing element is properly designed (when the grid has appropriate dimensions) as the titanium nitride-made grid.

Another reason why titanium nitride is selected as the material of the grid 2 is because the polarizing element can be fabricated more easily. As well known, titanium nitride is widely used for a barrier film (e.g., copper diffusion preventing film) and an electrode film (e.g., capacitor electrode film) in a semiconductor integrated circuit element (e.g., memories, logic elements, gates). Thus, a technology for forming a fine structure (micro structure) with titanium nitride is extensively studied in the art (film forming methods, deposition methods, etching methods, or the like), and such technology is established as a practical technology. When the grid polarizing element of this embodiment is fabricated, the fine structure forming technology with titanium nitride which is established in the semiconductor manufacturing process may be used.

In case of the grid polarizing element, particularly, the gap (spacing t in FIG. 1) between the linear portions 21 of the grid 2 is equal to or smaller than the wavelength of the light to be polarized. When the ultraviolet light is polarized, the gap t should be small (smaller than when the visible light is polarized). Thus, the polarizing element for the ultraviolet light needs finer processing than the polarizing element for the visible light. If a new material is selected as the material of the grid 2, a new technology for forming the grid 2 with such new material must be developed from the beginning and the resulting grid 2 has to have required fineness. When titanium nitride is selected as the material of the grid 2, on the other hand, an already established technology for fine processing the semiconductor can be used, as described above. Thus, the fabrication conditions can be decided easily, and the fabrication itself is easy.

When the grid polarizing element of this embodiment is compared to the wire grid polarizing elements disclosed in Patent Literatures 1 to 3 (Japanese Patent No. 5184624, Japanese Patent No. 5224252, and Japanese Patent No. 5277455), the grid polarizing element of this embodiment is superior because it can be fabricated easier, if considered from another point of view. Each of the wire grid polarizing elements of Japanese Patent No. 5184624, Japanese Patent No. 5224252, and Japanese Patent No. 5277455 has an element 26 made from a simple metal, and a multi-layer film on the element 26. The multi-layer film is made from a dielectric. In general, the simple metal such as aluminum or copper is difficult to process (machine), and difficult to etch.

In Patent Literatures 1 to 3 (Japanese Patent No. 5184624, Japanese Patent No. 5224252, and Japanese Patent No. 5277455), the element 26 is the grid, and has to have a fine structure. The element (grid) should have a stripe pattern by means of etching. To prepare the element 26, the upper film (dielectric multi-layer film) is etched to the stripe pattern, and then the simple metal layer is etched to form the element 26. However, an etchant that is highly reactive should be used when the simple metal is etched. During the etching, the resist may be damaged and reduced (scraped) such that the upper film (dielectric multi-layer film) is scraped. Thus, it is not easy to decide an appropriate etching condition. In addition, when the simple metal layer is etched to form the element 26, the metallic material (metals) separated (released) upon the etching may adhere onto the lateral face of the dielectric multi-layer film as a residue. If this occurs, the resulting optical structure may greatly be different from the designed optical structure.

On the contrary, the grid polarizing element of this embodiment simply needs to provide the grid 2, which is made from titanium nitride, on the transparent substrate 1. Thus, the grid polarizing element of this embodiment does not suffer from the difficulty that would be encountered when different materials are stacked (laminated) to form the grid structure. The etching to titanium nitride is performed by, for example, a dry process (reactive ion etching), with an etchant being carbon tetrafluoride ($CF_4$). Thus, the etching conditions can be decided without difficulty.

Figure 2:
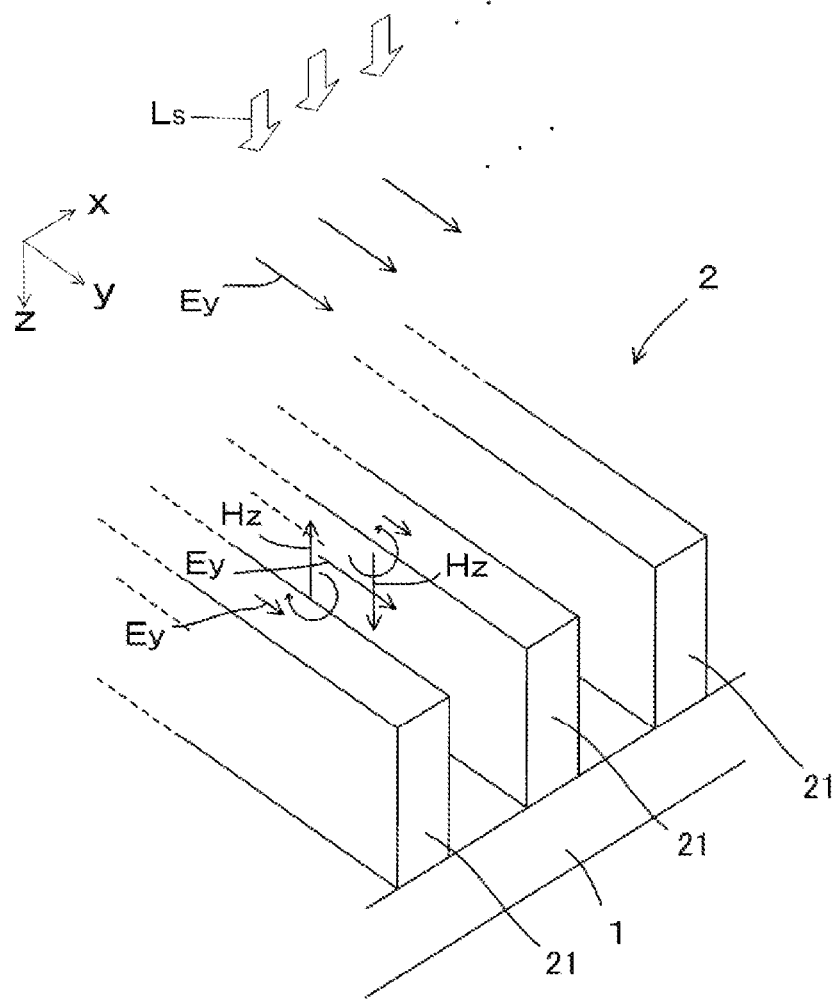
FIG. 2 is a schematic perspective view showing an exemplary functioning of an absorption type grid polarizing element.
Figure 3:
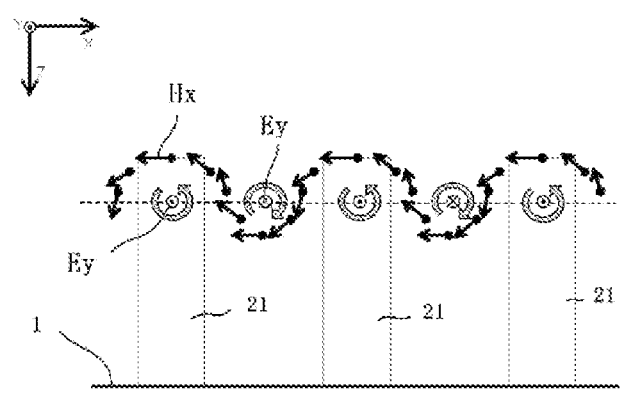
FIG. 3 is a schematic front view showing an exemplary functioning of the absorption type grid polarizing element.

The polarizing property of the absorption type polarizing element having the above-described titanium nitride-made grid 2 will be further described below. FIGS. 2 and 3 show the exemplary functioning of the absorption type grid polarizing element, respectively. Specifically, FIG. 2 illustrates a schematic perspective view, and FIG. 3 illustrates a schematic front view. It is assumed in FIGS. 2 and 3 for the sake of description that light propagates from the top of the drawing sheet toward the bottom of the drawing sheet, and this direction is referred to as "z-direction." The extending direction of the linear portions 21 of the grid 2 is referred to as "y-direction" and therefore the s polarized light (unshaded arrows "Ls" in FIG. 2) has an electric field component Ey. The direction of the magnetic field component Hx (FIG. 3) of the s polarized light is the x-direction.

When the s polarized light approaches (enters) the grid 2 of the grid polarizing element, the electric field Ey of the s polarized light is weakened by the linear portions 21 in accordance with the dielectric constant of the linear portions 21. The medium (substance) present between each two adjacent linear portions 21 is often the air (spacing), and the dielectric constant of the medium is generally smaller than the dielectric constant of the grid 2. Thus, the electric field Ey is less weakened in the spacing between the linear portions 21 than in the linear portions 21.

As a result, a rotating component in the x-y plane is derived (generated) from the electric field Ey. Two opposite magnetic fields Hz are induced in the z-direction based on the rotating intensity of the rotating component of the electric field Ey in the x-y plane. This can be expressed by the Maxwell's equation (1) shown below, which corresponds to the Faraday's law of electromagnetic induction.

$$RotE = -\frac{\partial B}{\partial t} \quad (1)$$

Specifically, one of the two magnetic fields Hz is directed in the light propagating direction (forward direction) and the other is directed in the backward direction, with the boundary being the peak of the electric field Ey extending along the center between each two adjacent linear portions 21. It should be noted that although not shown in FIG. 2, the magnetic field Hx in the x-direction has the same phase as the electric field Ey, and is directed in the negative direction of the x-axis. The magnetic field component Hx in the x-direction is pulled by the resulting component Hz in the z-direction and is deformed like a wave.

As the waving (rotation) of the magnetic field component Hx is generated, another magnetic field is produced in the y-direction in FIG. 2 in accordance with another Maxwell's equation (2) shown below, which corresponds to the Ampere-Maxwell law.

$$RotH = j + \varepsilon\frac{\partial E}{\partial t} \quad (2)$$

This is diagrammatically depicted in FIG. 3. The waving (rotation) of the x-direction magnetic field component Hx creates the new electric field Ey.

As shown in FIG. 3, the waving (rotation) of the magnetic field component Hx in the x-z plane produces the electric field Ey, which is directed toward a reader of this specification (upward in the direction perpendicular to the drawing sheet of FIG. 3), inside each of the linear portions 21, and the opposite electric field Ey (directed downward in the direction perpendicular to the drawing sheet of FIG. 3) is produced between each two adjacent linear portions 21. Because the original (initial) electric field Ey of the incident s polarized light is directed toward the reader of this specification (upward in the direction perpendicular to the drawing sheet of FIG. 3), the electric field produced between the linear portions 21 are cancelled (counteracted) by the above-mentioned rotation of the magnetic field and the wave motion of the magnetic field is divided. As a result, the electric field Ey is localized in the linear portions 21 of the grid 2, and the energy of the s polarized light is absorbed and extinguished by the linear portions 21 in accordance with the absorbing capability of the material of the linear portions 21 while the s polarized light propagates in the grid 2.

On the other hand, the electric field component Ex of the p polarized light is directed in the x-direction. When viewed in the y-direction, the distribution of the dielectric constant is uniform. Thus, there is substantially no rotating component of the electric field. Accordingly, unlike the s polarized light, the localization of the electric field in the grid 2 does not take place for the p polarized light, and the attenuation of the p polarized light does not take place in the linear portions 21. In summary, the absorption type grid polarizing element of this embodiment is configured such that the magnetic component Hx of the s polarized light has the waving portion (rotating portion) to localize the electric field Ey in the linear portions 21 and to selectively attenuate the s polarized light by means of the absorption in the linear portions 21. This functioning of the absorption type polarizing element may be used for the polarization of the visible light. Use of the absorption type polarizing element is particularly advantageous for the light having the UV wavelength region because an amount of the light to be absorbed by the grid material is great(er).

In case of the above-described absorption type grid polarizing element, it is preferred that the aspect ratio (h/w in FIG. 1) of each linear portion 21 of the grid 2 has a large(r) value. This is because, as understood from FIGS. 2 and 3, the attenuation of the s wave as a result of being absorbed by the linear portions 21 takes place in the propagating direction of the s wave (i.e., height direction of each linear portion 21). Thus, the attenuation of the s wave increases (i.e., extinction ratio increases) as the aspect ratio increases. For example, when the grid 2 is made from titanium nitride or titanium oxynitride, the aspect ratio is preferably equal to or greater than three, and more preferably equal to or greater than five.

Concrete dimensions are shown below. For example, when the near ultraviolet light having a wavelength in 200-380 nm wavelength region is polarized by the polarizing element, the width w of each linear portion 21 is about 15-50 nm, the height h of each linear portion 21 is about 70-300 nm, and the aspect ratio is about 5-15. The gap t between each two adjacent linear portions 21, which exerts a great influence on the polarizing effect, is about 30-150 nm.

A preferred method of fabricating the above-described grid polarizing element according to the first embodiment of the present invention will now be described. FIGS. 4A to 4E are a series of schematic front cross-sectional views useful to describe the preferred method of fabricating the grid polarizing element according to the first embodiment.

The grid polarizing element is fabricated by the above-mentioned thin film forming technology and the photolithography. The grid polarizing element of this embodiment is configured to polarize the ultraviolet light. In order to have a grid structure with a high aspect ratio, the fabrication method shown in FIGS. 4A to 4E temporarily forms a layer, which is referred to as "sacrifice layer."

Figure 4A:
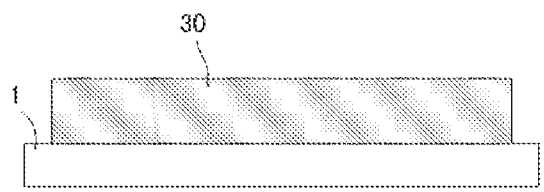
FIGS. 4A to 4E are a set of schematic front cross-sectional views useful to describe a preferred method of fabricating the grid polarizing element of the first embodiment.
Figure 4B:
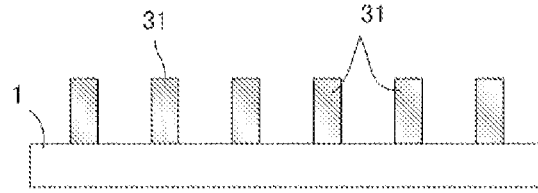

Specifically, a thin film 30 is formed on the transparent substrate 1, as shown in FIG. 4A. The thin film 30 is made from a material that becomes the sacrifice layer. A resist is applied on the thin film 30, and the thin film 30 undergoes the exposure and development. Then, the etching is performed with the resist pattern being the mask, to form a sacrifice layer 31 as shown in FIG. 4B. The sacrifice layer 31 has a stripe shape like the grid.

Figure 4C:
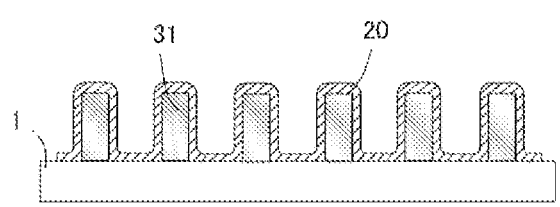

Subsequently, a thin film 20 of titanium nitride, which becomes the grid, is formed over the sacrifice layer 31 as shown in FIG. 4C. The titanium nitride thin film 20 is formed on the upper face and the lateral face (side face) of the sacrifice layer 31 and on the exposed surface of the transparent substrate 1.

Figure 4D:
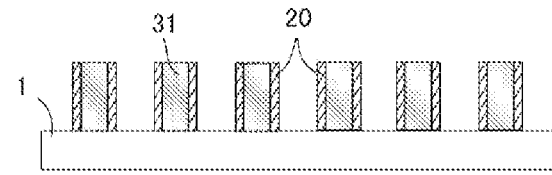

Then, the titanium nitride thin film 20 is selectively removed by the anisotropic etching. The etchant is oriented by the electric field and penetrates in the height direction of the sacrifice layer 31. Accordingly, the titanium nitride thin film 20 is removed from the upper face of the sacrifice layer 31 and the exposed surface of the transparent substrate 1, and the titanium nitride thin film 20 remains on only the side face of the sacrifice layer 31 as shown in FIG. 4D.

Figure 4E:
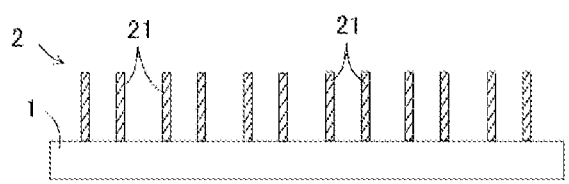

Subsequently, the etching is carried out with an etchant that can remove the sacrifice layer 31 only. Thus, the linear portions 21 made from titanium nitride are formed on the transparent substrate 1 as shown in FIG. 4E. In this manner, the grid 2 is obtained. The polarizing element having the grid 2 undergoes the washing step or cleaning step, and the grid polarizing element is obtained (polarizing element fabrication method is completed) as shown in FIG. 4E.

The material of the sacrifice layer 31 may be any suitable material as long as the material has a resistance to the etchant used in the etching applied to the titanium nitride thin film 20, and the material can be selectively removed by the subsequent etching (etching after the linear portions 21 are formed). For example, silicon is used as the material of the sacrifice layer 31.

In order to obtain the grid 2 having accurate dimensions by the above-described fabrication method, the titanium nitride thin film 20 on the side face of the sacrifice layer 31 is important. Specifically, the titanium nitride thin film 20 on the side face of the sacrifice layer 31 should have a sufficient and controlled thickness. Preferably, therefore, the atomic layer deposition (ALD) method is employed to form the thin film 20.

Specifically, a titanium complex such as titanium tetrachloride ($TiCl_4$) is used as a raw material gas in the ALD method. A first precursor gas, generated in the inductively coupled plasma, is caused to arrive at the surface of the transparent substrate 1 and be absorbed, so as to form a monoatomic layer upon saturation. An unnecessary (extra) raw material gas is removed by the purging process with an inert gas. Then, a second precursor gas, which is also generated in the inductively coupled plasma, is caused to arrive at the surface of the transparent substrate 1 so as to complete the reaction. This process is repeated to grow the film by one atomic layer (single monoatomic layer) at a time. How many times the process is repeated depends upon the thickness of the titanium nitride thin film 20 to be formed. For example, the process may be repeated 500 to 1,500 times.

Because the ALD method takes advantage of the absorption and saturation (self-stoppage) on the surface, it is possible to sufficiently form the film (deposit the material) on the inner face in the fine structure (e.g., the side face of the sacrifice layer 31). By appropriately selecting (deciding) the number of times of the repeating, it is also possible to accurately control the film thickness. Thus, the ADL method is preferably used in the method of fabricating the grid polarizing element of this embodiment.

Figure 5A:
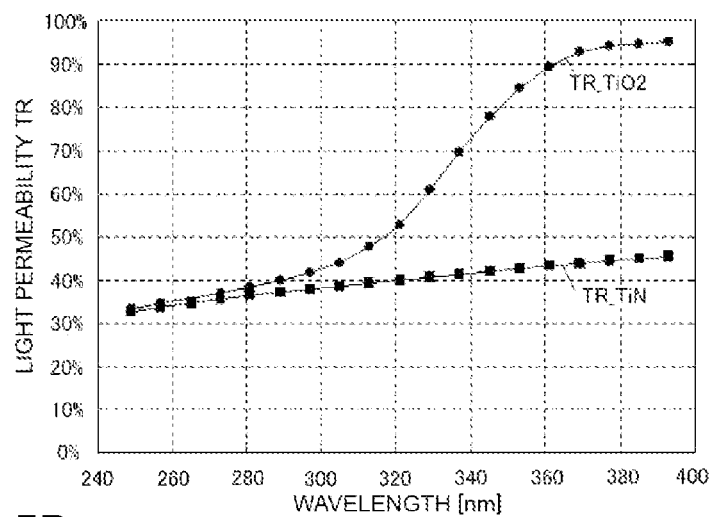
FIG. 5A shows a result of simulation with regard to relationship between the light permeability and the wavelength of the grid polarizing element according to the embodiment of the present invention.
Figure 5B:
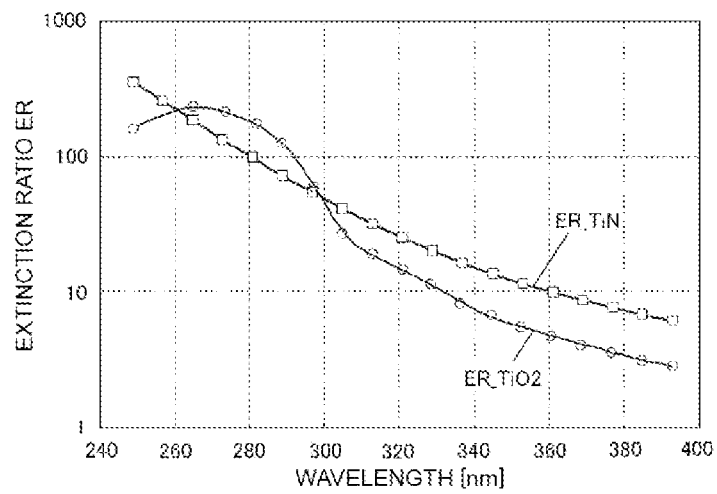
FIG. 5B shows a result of simulation with regard to relationship between the extinction ratio and the wavelength of the grid polarizing element.

An example of the grid polarizing element according to the above-described embodiment was tested about the polarizing capability (polarizing property) by simulation. FIGS. 5A and 5B show the results of the simulation test with regard to the polarizing property of the example of the grid polarizing element.

In the simulation, the grid 2 of the polarizing element is made from titanium nitride, the width w of each linear portion 21 is 20 nm, the height h is 170 nm, and the gap t is 70 nm. The light permeability (transmittance) TR and the extinction ratio ER were calculated at various wavelengths. A comparative example was also prepared. The grid of the comparative example was made from titanium oxide, and each linear portion had the same dimensions as the grid polarizing element of the embodiment of the present invention. The light permeability TR and the extinction ratio ER of this comparative example were also calculated in the same manner. The optical constant is needed to calculate the light permeability and the extinction ratio. The optical constants of titanium nitride and titanium oxide were obtained from the N & K database published by a particular French company (Sopra S.A., 26 Rue Pierre Joigneaux Bois-Colombes 92270 FRANCE). The simulation was performed in accordance with the Rigorous Coupled-Wave Analysis (RCWA) method, and used the software distributed by National Institute of Standard and Technology (NIST) in the US (http://physics.nist.gov/Divisions/Div844/facilities/scatmech/html/grating.htm).

In FIG. 5A, the vertical axis indicates the light permeability TR and the horizontal axis indicates the wavelength (nm). In FIG. 5B, the vertical axis indicates the extinction ratio ER and the horizontal axis indicates the wavelength (nm). The vertical axis of the graph of FIG. 5B uses the logarithmic scale. In FIG. 5A, the curve TR_TiN shows the light permeability of the titanium nitride-made grid, and the curve TR_TiO2 shows the light permeability of the titanium oxide-made grid. In FIG. 5B, the curve ER_TiN shows the extinction ratio of the titanium nitride-made grid, and the curve ER_TiO2 shows the extinction ratio of the titanium oxide-made grid.

As shown in FIG. 5A, the grid made from titanium oxide has a greater light permeability than the grid made from titanium nitride in the about 300-390 nm wavelength region, but the grid made from titanium nitride has a similar light permeability to the grid made from titanium oxide in the about 250-300 nm wavelength region.

As shown in FIG. 5B, the grid made from titanium nitride has a slightly greater extinction ratio than the grid made from titanium oxide in the about 300-390 nm wavelength region. The grid made from titanium oxide has a slightly greater extinction ratio than the grid made from titanium nitride in the about 260-300 nm wavelength region, but the grid made from titanium nitride has a greater extinction ratio than the grid made from titanium oxide in the wavelength region below 260 nm.

It should be noted that the extinction ratio is often sufficient if the extinction ratio is equal to or greater than about 7-8. Thus, the grid made from titanium nitride can satisfactorily be used in the about 320-390 nm wavelength region.

As described above, it can be said from the simulation results that although the grid made from titanium nitride is superior and inferior to the grid made from titanium oxide depending upon the wavelength, in general the grid made from titanium nitride has a similar polarizing capability (property) to the grid made from titanium oxide. FIGS. 5A and 5B do not show the light permeability (transmittance) and the extinction ratio of the grid made from titanium oxynitride, but it can easily be assumed that the grid made from titanium oxynitride has a similar polarizing capability (property) to the grid made from titanium oxide.

In the wavelength region below 260 nm, the extinction ratio of the grid made from titanium nitride is greater than that of the grid made from titanium oxide. Therefore, when the light having this wavelength region should be polarized (particularly when the polarization with the high extinction ratio is needed), the grid made from titanium nitride is significantly better than the grid made from titanium oxide.

In any case, the simulation results show that the polarizing property of the grid made from titanium nitride does not deteriorate (drop) very much even if the grid is partially oxidized, and that the polarizing property of the grid made from titanium oxynitride does not drop very much even if the grid is partially oxidized. Thus, the simulation results show that the grid made from titanium nitride and the grid made from titanium oxynitride can stably provide good polarizing effect.

As described above, the titanium nitride thin film is prepared by the ALD method with titanium tetrachloride ($TiCl_4$), for example, being a raw material gas. In the ADL method, the plasma for activating the raw material gas is the high frequency plasma which is generated in a discharge space by the applied electric power of about 300-1,000 W. The temperature of the transparent substrate is 200-600 degrees C. when the deposition is carried out. The purge gas is nitrogen. The number of times of repeating the deposition process (how many times the monoatomic layers are laminated) is about 500-1,500. The resulting thickness of the titanium nitride thin film becomes about 12-36 nm.

Second Embodiment

Figure 6:
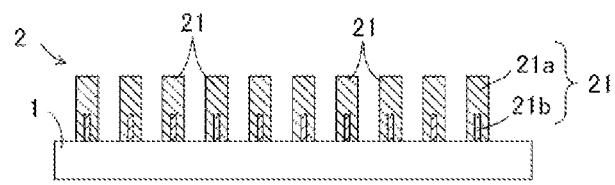
FIG. 6 is a schematic front cross-sectional view of a grid polarizing element according to a second embodiment of the present invention.

Now, a grid polarizing element according to a second embodiment of the present invention will be described. FIG. 6 illustrates a schematic front cross-sectional view of the grid polarizing element of the second embodiment. Like reference numerals and signs are used in the first and second embodiments when they indicate like elements and components.

In the grid polarizing element shown in FIG. 6, the main layer 21a of each of the linear portions 21 of the grid 2 is made from titanium oxynitride. As shown in FIG. 6, each linear portion 21 also has a subordinate (secondary) layer 21b. The secondary layer 21b is made from titanium oxide. As depicted in FIG. 6, the secondary layer 21b made from titanium oxide occupies less than 50% of the entire cross-section of the linear portion 21. The secondary layer 21b occupies less than 50% of the entire volume of the linear portion 21.

FIGS. 7A to 7F are a series of schematic front cross-sectional views to show an exemplary method of fabricating the grid polarizing element of the second embodiment shown in FIG. 6.

Figure 7A:
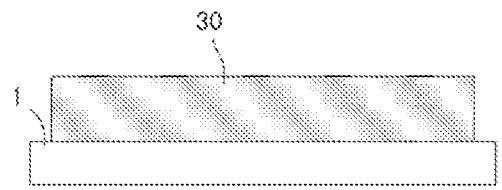
FIGS. 7A to 7F are a set of schematic front cross-sectional views useful to describe a method of fabricating the grid polarizing element of the second embodiment shown in FIG. 6.
Figure 7B:
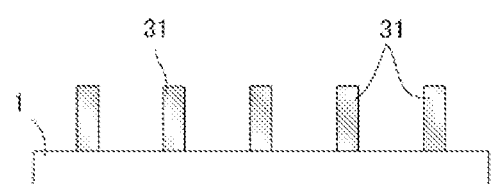

When the grid polarizing element of the second embodiment is fabricated, the thin film 30 which is made from the material of a sacrifice layer is formed on the transparent substrate 1, as shown in FIG. 7A. This is similar to the first embodiment. Then, a resist is applied on the thin film 30, and the thin film 30 undergoes the exposure and development. The thin film 30 is etched, with the resist pattern being used as the mask, so as to form the sacrifice layer 31, as shown in FIG. 7B.

Figure 7C:
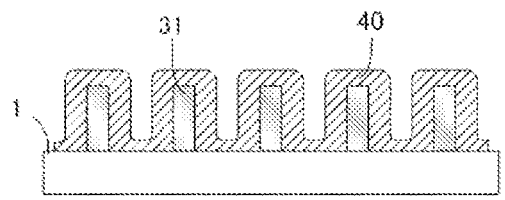

Subsequently, a thin film 40 of titanium oxide is formed over the sacrifice layer 31, as shown in FIG. 7C. The titanium oxide thin film 40 will become the grid. The titanium oxide thin film 40 is formed on the upper face and side face of the sacrifice layer 31 and on the exposed surface of the transparent substrate 1.

Figure 7D:
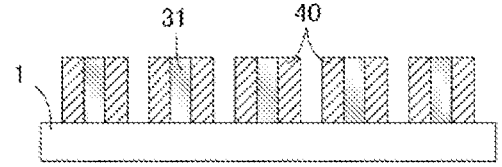

Then, the titanium oxide thin film 40 is selectively removed by the anisotropic etching. Like the first embodiment, the etchant is oriented by the electric field, and the titanium oxide thin film 40 is removed from the upper face of the sacrifice layer 31 and the exposed surface of the transparent substrate 1 such that the titanium oxide thin film 40 remains on only the side face of the sacrifice layer 31 as shown in FIG. 7D.

Figure 7E:
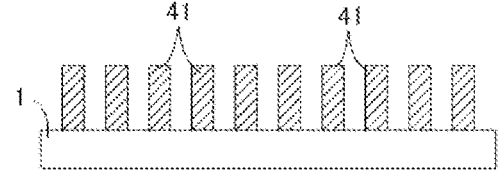

Subsequently, the etching is carried out with an etchant that can remove the sacrifice layer 31 only. This is similar to the first embodiment. Thus, the linear portions 41 made from titanium oxide are formed on the transparent substrate 1 as shown in FIG. 7E.

Figure 7F:
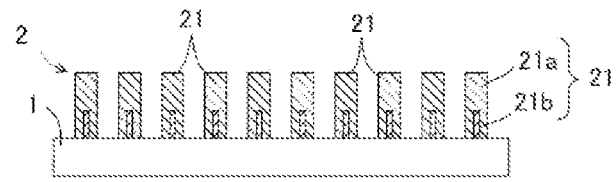

Then, a nitriding process is applied to the linear portions 41 to obtain the linear portions 21 that have the main layer 21a made from titanium oxynitride and the secondary layer 21b made from titanium oxide, as shown in FIG. 7F. For example, the linear portions 41 are exposed to the nitrogen plasma, and the nitrogen treatment proceeds with the active nitrogen species and/or the nitrogen ions in the plasma. The nitriding takes place from the surface of the linear portions 41. Because each of the linear portions 41 is fine (in the order of nanometers), the nitriding proceeds to the deep areas of the linear portions 41 as the linear portions 41 are exposed to the nitrogen plasma for a certain time. It is possible to cause the titanium oxynitride layer 21a to occupy 50% (or more than 50%) of the entire cross-section of each linear portion. In this manner, the grid 2 is obtained. The polarizing element having the grid 2 undergoes the washing step or cleaning step (as in the first embodiment), and the grid polarizing element is obtained (polarizing element fabrication method is completed) as shown in FIG. 7F.

In the grid polarizing element of the second embodiment, each of the linear portions 21 of the grid 2 has a layer (i.e., main layer 21a) that is made from titanium oxynitride, and titanium oxynitride has a suitable light absorbing property and is chemically stable. Thus, the grid polarizing element of the second embodiment can function as the absorption type polarizing element. Also, the grid polarizing element does not suffer from the deterioration of the polarizing property (polarizing effect) even when the polarizing element is used in the oxidizing environment. Accordingly, the grid polarizing element of the second embodiment is a preferred polarizing element for use in the polarization of the light having the UV wavelength region.

The linear portions 41 are formed from titanium oxide and then the nitriding treatment is applied to obtain the titanium oxynitride grid 2. Therefore, the fabrication process is simple. The fabrication process does not include a difficult step to etch a multi-layer film, which is made from different kinds of materials including simple metal layers. It should be noted that the entire interior of each of the linear portions 41 may be nitrided. In this case, each linear portion 21 includes the main layer 21a only. The main layer 21a is made from titanium oxynitride.

In the above-described fabrication method, the ADL process may preferably be used to form the titanium oxide thin film 40. Titanium tetrachloride ($TiCl_4$), for example, may be used as a raw material gas in the ADL process. Various microprocessing technologies established for the semiconductor manufacturing process may be applied to the titanium oxide, as in the case of titanium nitride.

The titanium oxide thin film 40 is prepared as the thin film for the grid, and is nitrided to form the main layer 21a, which is made from titanium oxynitride, in the second embodiment. Alternatively, the titanium nitride thin film may be prepared as the thin film for the grid, and be oxidized to form the main layer, which is made from titanium oxynitride. The oxidizing process may be performed with an oxygen plasma. The oxygen plasma is prepared by the high frequency discharge, and the titanium nitride thin film is exposed to the oxygen plasma. In this case, the oxidizing process may only be applied to the surface part of the titanium nitride, and the remaining part may be left as titanium nitride.

Other Embodiments

Figure 8A:
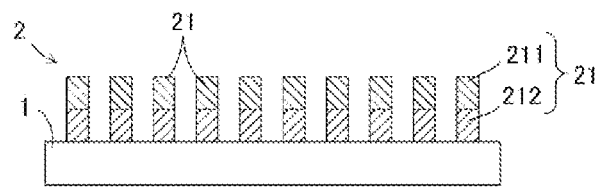
FIG. 8A is a schematic front cross-sectional view showing a grid polarizing element according to another embodiment of the present invention.
Figure 8B:
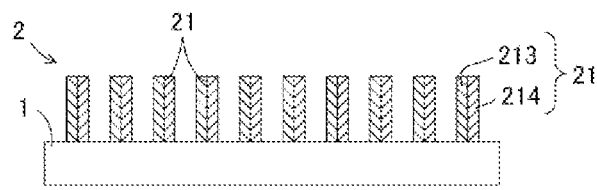
FIG. 8B is a schematic front cross-sectional view of a grid polarizing element according to still another embodiment of the present invention.
Figure 8C:
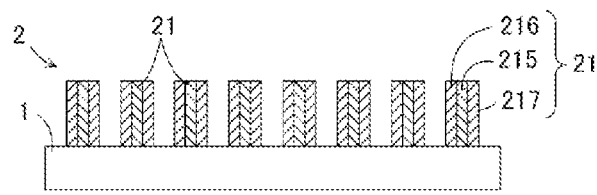
FIG. 8C is a schematic front cross-sectional view of a grid polarizing element according to yet another embodiment of the present invention.

Other embodiments of the grid polarizing element will be described below. FIGS. 8A, 8B and 8C show schematic front cross-sectional views of different grid polarizing elements, respectively.

It should be noted that the grid polarizing element of the present invention may be practiced in the forms of other than the first and second embodiments. For example, FIG. 8A shows one modification to the above-described embodiments. As illustrated in FIG. 8A, each of the linear portions 21 may be divided into an upper layer and a lower layer. The upper layer may be a first layer 211 made from titanium nitride, and the lower layer may be a second layer 212 made from titanium oxynitride. It should be noted that the lower layer may be the first layer 211 made from titanium nitride, and the upper layer may be the second layer 212 made from titanium oxynitride.

FIG. 8B shows another modification. As illustrated in FIG. 8B, a first layer 213 made from titanium nitride stands next to a second layer 214 made from titanium oxynitride. The first layer 213 is in contact with the second layer 214. The two layers 213 and 214 form in combination a single linear portion 21.

FIG. 8C shows still another modification. As illustrated in FIG. 8C, a first layer 215 made from titanium nitride stands between two second layers 216 and 217. Both of the second layers 216 and 217 are made from titanium oxynitride. The layers 215 and 216 are in contact with each other, and the layers 215 and 217 are in contact with each other. The three layers 215, 216 and 217 form in combination a single linear portion 21. It should be noted that each linear portion may include two first layers 215 and one second layer such that the second layer may be sandwiched between the two first layers 215.

In the embodiments shown in FIGS. 8A to 8C, the main layer of the grid is formed by the titanium nitride layer(s) and the titanium oxynitride layer(s). As such, the main layer may be formed from titanium nitride only, titanium oxynitride only, or a combination of titanium nitride and titanium oxynitride.

Method and Apparatus for Irradiating an Object with Polarized UV Light

Now, an exemplary method of irradiating an object with polarized ultraviolet light and an exemplary apparatus for irradiating an object with polarized ultraviolet light will be described. Although the following description deals with a photo-alignment device and a method of fabricating a substrate having a photo-aligned layer, the device and method use a mercury lamp and therefore the following description will explain a method of irradiating an object with polarized ultraviolet light and an apparatus for irradiating an object with polarized ultraviolet light.

Figure 9:
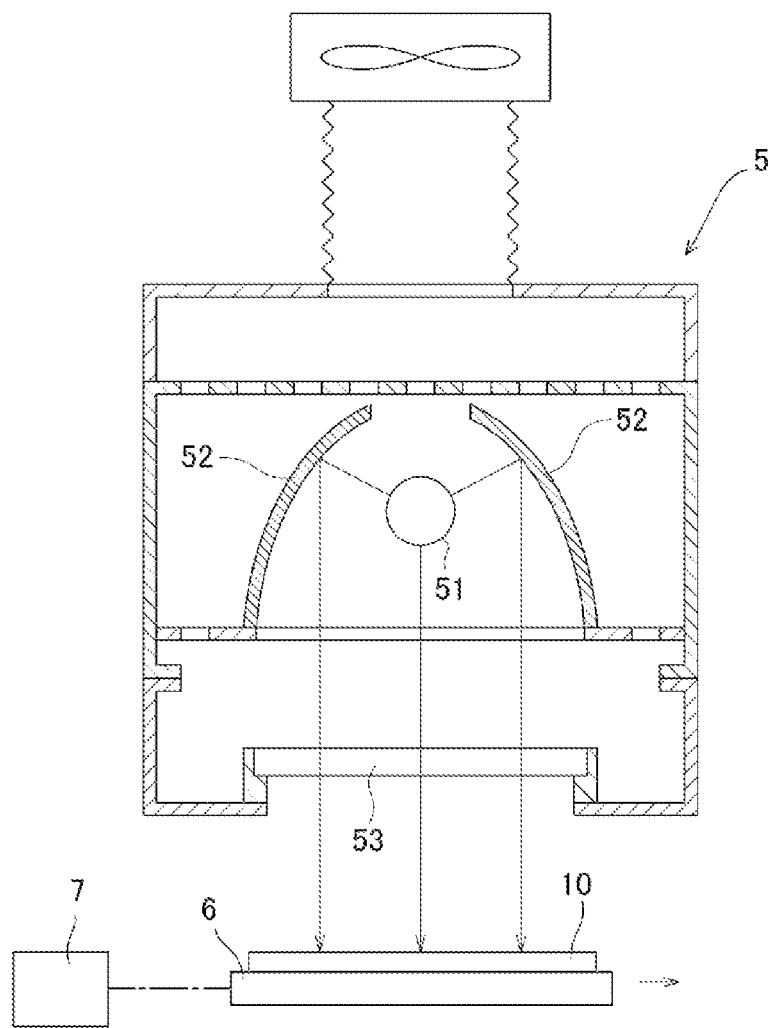
FIG. 9 is a schematic cross-sectional view of a photo-alignment device, which is used in a method of fabricating a substrate having a photo-alignment layer according to one embodiment of the present invention.

FIG. 9 illustrates a schematic cross-sectional view of a photo-alignment device, and is useful to describe a method of fabricating a substrate having a photo-aligned layer according to an embodiment of the present invention. The photo-alignment device shown in FIG. 9 is designed to obtain a photo-aligned layer when a liquid crystal display or the like is fabricated. A film for a photo-aligned layer (film to become a photo-aligned layer) is irradiated with the polarized light to cause a molecular structure of the film to align in a particular direction. A workpiece 10 is a substrate such as a liquid crystal substrate, on which a film for a photo-aligned layer is formed. The film for the photo-aligned layer is made from, for example, polyimide.

The photo-alignment device shown in FIG. 9 includes a light irradiation unit 5 for irradiating an irradiation area (target area) with the polarized light, a stage 6 on which the workpiece 10 is placed, and a moving mechanism (transfer mechanism) 7 for linearly moving the stage 6 such that the stage 6 passes the irradiation area and the workpiece 10 on the stage 6 also passes the irradiation area. Although the detail of the moving mechanism 7 is not shown in FIG. 9, the exemplary moving mechanism 7 includes, for example, a straight movement mechanism that has a ball screw and a linear motion guide. It should be noted that the film itself for the photo-aligned layer can be the workpiece (object to be irradiated with the polarized light). In this case, the moving mechanism is configured to transfer, for example, a polyimide sheet-like film from a roll to another roll, and the polyimide film is irradiated with the polarized light while the polyimide film is being transferred.

The light irradiation device 5 includes a light source 51, a mirror 52 disposed behind the light source 51, and a grid polarizing element 53 disposed between the light source 51 and the workpiece 10. The grid polarizing element 53 is one of the grid polarizing elements described in the above-described embodiments and modifications.

Because the photo-alignment needs the irradiation of the ultraviolet light, a long arc type low-pressure mercury lamp or a long arc type high-pressure mercury lamp is employed as the light source 51. In general, the mercury lamp of which a sealed body inner pressure is equal to or less than 100 Pa is referred to as a "low-pressure mercury lamp" and the mercury lamp having a higher inner pressure (higher than 100 Pa) is referred to a "high-pressure mercury lamp." The light source 51 is elongated in a direction perpendicular to the transfer (moving) direction of the workpiece 10. In this embodiment, the light source 51 is elongated in a direction perpendicular to the drawing sheet. The mirror 52 includes a pair of mirror pieces that are elongated in the same direction as the light source 51. The cross-sectional shape of the reflecting plane of the mirror 52 is arcuate such as parabolic or oval.

As described above, the grid polarizing element 53 is configured to selectively allow the p polarized light to pass through the grid polarizing element in accordance with the length of the grid. Thus, the grid polarizing element 53 is accurately positioned (oriented) relative to the workpiece 10 such that the polarization axis of the p polarized light is oriented in the direction of the photo-alignment.

It should be noted that it is difficult to fabricate the grid polarizing element 53 in a large scale. If a large area should be irradiated with the polarized light, then a plurality of grid polarizing elements 53 may be arranged on (in) the same plane. This plane of the grid polarizing elements 53 is parallel to the surface of the workpiece 10, and the longitudinal direction of the grid of each grid polarizing element 53 has a prescribed relationship relative to the workpiece 10. The grid of each polarizing element 53 is oriented in a prescribed direction relative to the workpiece 10.

In the irradiation area, the workpiece 10 is irradiated with the polarized light emitted through the grid polarizing element 53. As a result, the molecular structure of the film to be a photo-aligned layer formed in the workpiece 10 is aligned in the direction of the polarization axis of the polarized light, and the photo-aligned layer is obtained. In other words, the substrate having the photo-aligned layer is fabricated. When the workpiece is a film member to be photo-aligned, which is transferred from one roll to another roll, the film member (workpiece) is cut to a suitable size after the photo-alignment, and the cut piece is attached (affixed) to the substrate. The substrate having the photo-aligned layer is fabricated in this manner.

As described above, when the linear portions of the grid of the grid polarizing element 53 are made from titanium nitride, the grid polarizing element 53 has a notable polarizing effect, i.e., the grid polarizing element 53 has the increased (higher) extinction ratio in the wavelength region equal to or less than 260 nm. The increased extinction ratio means that the purity (degree of polarization) of the polarized light is high in the direction of the polarization axis, and that the photo-alignment is carried out clearly (sharply). It is well known that the low-pressure mercury lamp has a strong bright line spectrum at 254 nm or 185 nm. When such mercury lamp is combined with the grid polarizing element 53 having the titanium nitride-made grid to configure the photo-alignment device, the photo-alignment device can provide a significant advantage, i.e., can provide even higher quality photo-aligned layers at a high productivity.

When the material of the grid of the polarizing element is titanium oxynitride, it is assumed that the polarizing element can also demonstrate a high extinction ratio to the bright line spectrum at 254 nm although the extinction ratio may be slightly inferior to the polarizing element having the grid made from titanium nitride. Thus, it is considered that the polarizing element having the grid made from titanium oxynitride can provide a similar effect to the polarizing element having the grid made from titanium nitride. Such effect is particularly meaningful when the polarizing element is looked at the viewpoint of the photo-alignment. Apart from the photo-alignment, in general, use of titanium nitride and use of titanium oxynitride as the grid material of the polarizing element are both satisfactory when an object should be irradiated with the polarized light at high-quality high illuminance in the UV wavelength region.

It should be noted that although the photo-alignment device has the transfer mechanism 7 in the foregoing description, the transfer mechanism 7 may be dispensed with. The photo-alignment device may only have a structure (e.g., stage 6) to hold the workpiece 10 in the polarized light irradiation area.

Although each of the films 20 and 40 which is the dominant layer (main layer) of the linear portions 21 of the grid polarizing element is formed by the ALD method in the above-described embodiments, it may be formed by a CVD (chemical vapor deposition) method, a sputtering method or the like.

In the foregoing, the ultraviolet light to be polarized has a UV wavelength (particularly, wavelength equal to or shorter than 260 nm), but the grid polarizing element of each of the above-described embodiments may preferably be used to polarize the ultraviolet light in a 260-380 nm wavelength region (e.g., ultraviolet light at a wavelength of 365 nm).

Although the gap between each two adjacent linear portions 21 of the grid 2 of the grid polarizing element is the air in the foregoing description, the gap may be filled with a suitable material.

While certain embodiments have been described, these embodiments have been presented by way of example only, and are not intended to limit the scope of the present invention. The novel polarizing element described herein may be embodied in a variety of other forms; furthermore, various omissions, substitutions and changes in the form of the polarizing element described herein may be made without departing from the gist of the present invention. The accompanying claims and their equivalents are intended to cover such forms or modifications as would fall within the scope and gist of the present invention.

The present application is based upon and claims the benefit of a priority from Japanese Patent Application No. 2013-269614, filed Dec. 26, 2013, and the entire content of which is incorporated herein by reference.

What is claimed is:

1. A non-reflection type grid polarizing element for selectively transmitting a first type of polarized light and absorbing a second type of polarized light among incident light through the grid polarizing element to polarize the incident light, comprising:
  a flat transparent substrate having a flat surface; and
  a plurality of linear portions, arranged like a stripe, on the flat surface of the transparent substrate, each of the plurality of linear portions having a dominant layer made from titanium nitride or titanium oxynitride, the plurality of linear portions containing no simple metal layers, the plurality of linear portions being configured to absorb said second type of polarized light.

2. The non-reflection type grid polarizing element according to claim 1, wherein each said linear portion has a rectangular shape in its cross section, and a ratio h/w is equal to or greater than three, where h represents a height of the rectangular shape of each said linear portion and w represents a width of the rectangular shape of each said linear portion.

3. The non-reflection type grid polarizing element according to claim 2, wherein the second type of polarized light to be absorbed by the plurality of linear portions has a polarization axis in a longitudinal direction of the linear portions in a larger amount than the first type of polarized light that has a polarization axis in a direction perpendicular to the longitudinal direction of the linear portions while the light is propagating in a thickness direction of the linear portions, thereby polarizing the incident light.

4. The non-reflection type grid polarizing element according to claim 3, wherein spacing between each two adjacent linear portions of the plurality of linear portions can polarize ultraviolet light.

5. The non-reflection type grid polarizing element according to claim 4, wherein the spacing between each said two adjacent linear portions of the plurality of linear portions is equal to or greater than 100 nm and no greater than 200 nm.

6. The non-reflection type grid polarizing element according to claim 2, wherein spacing between each two adjacent linear portions of the plurality of linear portions can polarize ultraviolet light.

7. The non-reflection type grid polarizing element according to claim 6, wherein the spacing between each said two adjacent linear portions of the plurality of linear portions is equal to or greater than 100 nm and no greater than 200 nm.

8. The non-reflection type grid polarizing element according to claim 1, wherein the second type of polarized light to be absorbed by the plurality of linear portions has a polarization axis in a longitudinal direction of the linear portions in a larger amount than the first type of polarized light that has a polarization axis in a direction perpendicular to the longitudinal direction of the linear portions while the light is propagating in a thickness direction of the linear portions, thereby polarizing the incident light.

9. The non-reflection type grid polarizing element according to claim 8, wherein spacing between each two adjacent linear portions of the plurality of linear portions can polarize ultraviolet light.

10. The non-reflection type grid polarizing element according to claim 9, wherein the spacing between each said two adjacent linear portions of the plurality of linear portions is equal to or greater than 100 nm and no greater than 200 nm.

11. The non-reflection type grid polarizing element according to claim 1, wherein spacing between each two adjacent linear portions of the plurality of linear portions can polarize ultraviolet light.

12. The non-reflection type grid polarizing element according to claim 11, wherein the spacing between each said two adjacent linear portions of the plurality of linear portions is equal to or greater than 100 nm and no greater than 200 nm.

13. An apparatus for irradiating an object with polarized ultraviolet light, comprising:
a mercury lamp configured to emit light including a bright line spectrum equal to or less than 260 nm; and
a non-reflection type grid polarizing element of claim 12 disposed at a position where the light emitted from the mercury lamp reaches, and configured to irradiate the object with the polarized light that has passed the non-reflection type grid polarizing element.

14. A photo-alignment apparatus comprising:
an ultraviolet light source configured to emit light;
a non-reflection type grid polarizing element of claim 12 disposed at a first position where the light emitted from the ultraviolet light source reaches; and
a unit configured to transport or place a film, which becomes a photo-aligned layer, at a second position irradiated with the polarized ultraviolet light that has passed the non-reflection type grid polarizing element.

15. An apparatus for irradiating an object with polarized ultraviolet light, comprising:
a mercury lamp configured to emit light including a bright line spectrum equal to or less than 260 nm; and
a non-reflection type grid polarizing element of claim 11 disposed at a position where the light emitted from the mercury lamp reaches, and configured to irradiate the object with the polarized light that has passed the non-reflection type grid polarizing element.

16. A photo-alignment apparatus comprising:
an ultraviolet light source configured to emit light;
a non-reflection type grid polarizing element of claim 11 disposed at a first position where the light emitted from the ultraviolet light source reaches; and
a unit configured to transport or place a film, which becomes a photo-aligned layer, at a second position irradiated with the polarized ultraviolet light that has passed the non-reflection type grid polarizing element.

17. A method of irradiating an object with polarized ultraviolet light, comprising:
arranging a non-reflection type grid polarizing element for selectively transmitting particular polarized light among incident light through the grid polarizing element to polarize the incident light, the non-reflection type grid polarizing element comprising a transparent substrate; and a grid disposed on the transparent substrate and having a plurality of linear portions arranged like a stripe, each of the plurality of linear portions having a dominant layer made from titanium nitride or titanium oxynitride, the plurality of linear portions containing no simple metal layers, wherein spacing between each two adjacent linear portions of the plurality of linear portions of the grid can polarize ultraviolet light, at a position where light emitted from a mercury lamp reaches, the light emitted from the mercury lamp including a bright line spectrum equal to or less than 260 nm; and
irradiating the object with the polarized light that has passed the non-reflection type grid polarizing element.

18. The method according to claim 17, wherein the spacing between each said two adjacent linear portions of the grid is equal to or greater than 100 nm and no greater than 200 nm.

19. A method of fabricating a substrate that has a photo-aligned layer, comprising:
arranging a non-reflection type grid polarizing element for selectively transmitting particular polarized light among incident light through the grid polarizing element to polarize the incident light, the non-reflection type grid polarizing element comprising a transparent substrate; and a grid disposed on the transparent substrate and having a plurality of linear portions arranged like a stripe, each of the plurality of linear portions having a dominant layer made from titanium nitride or titanium oxynitride, the plurality of linear portions containing no simple metal layers, wherein spacing between each two adjacent linear portions of the plurality of linear portions of the grid can polarize ultraviolet light, at a position where light emitted from a ultraviolet light source reaches; and
irradiating a film, which becomes the photo-aligned layer, with the polarized ultraviolet light that has passed the non-reflection type grid polarizing element.

20. The method according to claim 19, wherein the spacing between each said two adjacent linear portions of the grid is equal to or greater than 100 nm and no greater than 200 nm.

* * * * *